US012698759B2

(12) United States Patent
Pliszka

(10) Patent No.: US 12,698,759 B2
(45) Date of Patent: Aug. 4, 2026

(54) MOUNTING EQUIPMENT ON WIND TURBINE STRUCTURES

(71) Applicant: SUBSEA 7 LIMITED, Sutton (GB)

(72) Inventor: Dominic Pliszka, Aberdeen (GB)

(73) Assignee: SUBSEA 7 LIMITED, Sutton (GB)

( * ) Notice: Subject to any disclaimer, the term of this patent is extended or adjusted under 35 U.S.C. 154(b) by 0 days.

(21) Appl. No.: 18/866,103

(22) PCT Filed: May 17, 2023

(86) PCT No.: PCT/GB2023/051304
§ 371 (c)(1),
(2) Date: Nov. 15, 2024

(87) PCT Pub. No.: WO2023/223034
PCT Pub. Date: Nov. 23, 2023

(65) Prior Publication Data
US 2025/0314242 A1      Oct. 9, 2025

(30) Foreign Application Priority Data

May 17, 2022    (GB) ..................................... 2207218

(51) Int. Cl.
*F03D 80/50*          (2016.01)
*F03D 13/25*          (2016.01)
(52) U.S. Cl.
CPC .......... *F03D 80/501* (2023.08); *F03D 13/25* (2016.05); *F05B 2230/6102* (2013.01); *F05B 2240/95* (2013.01)
(58) Field of Classification Search
CPC ........ F03D 80/501; F03D 80/50; F03D 13/10; F03D 13/00; F03D 13/20; F03D 80/00; F05B 2230/61; E04G 3/00; E04H 12/00
See application file for complete search history.

(56) References Cited

U.S. PATENT DOCUMENTS

2014/0300112 A1* 10/2014 Lee ......................... F03D 13/22
294/67.1

FOREIGN PATENT DOCUMENTS

CN        102701083 B  *  5/2014  ............. B66C 19/00
CN        104350276 A  *  2/2015  ............. F03D 80/60
(Continued)

OTHER PUBLICATIONS

International Search Report of PCT/GB2023/051304 dated Sep. 7, 2023.
(Continued)

*Primary Examiner* — Pedro J Cuevas
(74) *Attorney, Agent, or Firm* — MATTINGLY & MALUR, PC

(57)          ABSTRACT
A support system arranged to support equipment such as electrolysers externally on a wind turbine. A hub encircling or coextensive with a tower or transition piece of the wind turbine surrounds a central vertical axis. The hub defines at least one docking bay having mounting formations to which a support module can be releasably engaged, thereby providing an equipment platform cantilevered from the hub. Where the hub comprises a plurality of docking bays spaced apart angularly around the central axis, a corresponding plurality of support modules are engageable with the hub in a petaloid arrangement. In plan view, the docking bays correspond with respective sides of a polygon. On installation, each support module is suspended on hook formations of a docking bay and is then pivoted into engagement with other mounting formations of the docking bay. The hub can be assembled from sections around the tower in a retrofitting operation.

33 Claims, 9 Drawing Sheets

(56)     References Cited

FOREIGN PATENT DOCUMENTS

| | | | | | |
|----|----|----|----|----|----|
| CN | 104395600 | A | * | 3/2015 | ........... F03D 7/0204 |
| CN | 206720599 | U | * | 12/2017 | ............ B66C 23/04 |
| CN | 104350276 | B | * | 10/2018 | ............ F03D 15/20 |
| CN | 208182503 | U | * | 12/2018 | ............ B66C 23/68 |
| CN | 113006049 | A | | 6/2021 | |
| EP | 2185816 | A | | 5/2010 | |
| EP | 2586933 | | | 5/2013 | |
| EP | 2730781 | A1 | * | 4/2017 | ............ B66C 23/52 |
| EP | 2730781 | B1 | * | 4/2017 | ............ B66C 23/52 |
| EP | 3263891 | A1 | | 1/2018 | |
| KR | 20130006559 | A | * | 1/2013 | ............ B66C 23/52 |
| KR | 101337646 | B1 | * | 12/2013 | ............ B66C 23/52 |
| KR | 20140074499 | A | | 6/2014 | |
| KR | 20150111575 | A | | 10/2015 | |
| KR | 101859978 | B1 | | 6/2018 | |
| WO | WO-2012007306 | A2 | * | 1/2012 | ............ F03D 13/10 |
| WO | WO-2013008986 | A1 | * | 1/2013 | ............ B66C 23/52 |
| WO | 2016/055067 | A1 | | 4/2016 | |
| WO | 2016/122334 | A1 | | 8/2016 | |
| WO | 2020/043256 | A1 | | 3/2020 | |
| WO | 2021/136570 | A1 | | 7/2021 | |

OTHER PUBLICATIONS

International Preliminary Report on Patentability received in corresponding International Application No. PCT/GB2023/051304 dated Sep. 3, 2024.

* cited by examiner

MOUNTING EQUIPMENT ON WIND TURBINE STRUCTURES

This invention relates to the use of wind turbine structures to support external ancillary equipment, such as solar panels and/or electrolysers for producing hydrogen from seawater. The invention is particularly concerned with the challenges of mounting equipment externally onto the upright columnar structure of a wind turbine, that structure being its mast or tower or a supporting transition piece between the tower and a foundation.

As generation of electricity from wind turbines is variable or intermittent, additional generation capacity may be required to ensure a continuous supply of green electrical power. In this respect, excess power generated from renewable sources can be used to produce hydrogen, known in that context as 'green hydrogen', when the supply of electricity exceeds other demands.

The principle of converting surplus electrical energy into hydrogen or other gas fuel is known as power-to-gas or P2G. Once electrical energy is converted into gas, it can be used for various purposes. For example, hydrogen produced from renewable energy can be used for power generation, such as powering a fuel cell to generate electricity when demand for electricity would otherwise exceed supply from other green sources.

Hydrogen can be produced by a carbon-free electrolysis process in an electrolyser, in which an electric current splits water into hydrogen and oxygen. Seawater can be subjected to electrolysis if using an anode adapted to counteract the formation of chlorine gas from dissolved salt.

Electrical energy for electrolysis can be generated by a wind turbine or by ancillary generating apparatus, such as an array of solar panels, that may conveniently be supported by the structure of a wind turbine. Where a wind turbine is situated offshore, either fixed relative to the seabed or floating at the surface, its structure can also support ancillary generating apparatus below or at the surface, such as a tidal turbine or a wave energy generator, in addition to solar panels above the surface. Thus, offshore wind turbines represent a substantial opportunity to use wind energy and solar, tidal and/or wave energy for the generation of green hydrogen at scale.

In principle, electrolysers can also be supported by a wind turbine structure. Offshore, this avoids the need for standalone platforms or for dedicated or adapted surface vessels. However, electrolysers of useful capacity are bulky and so must be mounted externally to the wind turbine structure, especially if they are retrofitted to an existing wind turbine. Necessarily, ancillary generating apparatus such as a solar panel array also requires external mounting.

Consequently, there is a need for an external mount or platform for a wind turbine to support ancillary equipment such as electrolysers and solar panels. Such a platform must be capable of supporting a heavy load if used to support electrolysers and must define a usefully large surface area if used to support solar panels.

Despite necessarily being large and robust for these purposes, a platform must also be easy to install and to remove, especially in an offshore environment, either when constructing or dismantling a wind turbine or when retrofitting an existing wind turbine. Ease of installation and removal applies especially if the platform is designed to be interchangeable or modular and therefore to be removable and replaceable for repair or maintenance of the equipment it supports.

The platform must also complement the structure of the wind turbine without compromising the integrity or the balance of that structure. This applies especially in offshore applications and more especially when used on a floating wind turbine.

It is, of course, well known in general terms to mount a platform on a wind turbine. For example, platforms are commonly mounted on a wind turbine tower to provide access to the interior of the tower and to electrical equipment for maintenance. An example is shown in WO 2016/055067, which reflects that platforms like these are typically cantilevered and ring-shaped to encircle the circular cross-section of the tower that supports them. In offshore applications, such a platform may be connected to a ladder or stairway that allows personnel to transfer from a boat alongside. A similar platform may also be situated close to the nacelle of the wind turbine for maintenance of its main moving parts.

Known wind turbine platforms like that shown in WO 2016/055067 do not extend far from the tower in a radial direction, being more in the nature of a walkway around the tower. Even though a portion of the platform may be cantilevered further from the tower to support a small crane or hoist, that part of the platform cannot support heavy and bulky equipment. Indeed, if a heavy load is placed on an asymmetric platform, the platform would exert significant bending stresses on the tower and could unbalance the wind turbine, especially if floating offshore.

In addition, a conventional platform like that shown in WO 2016/055067 is a permanent fixture designed to be installed with the wind turbine, and is often pre-installed on the tower before the tower and the platform are lifted and installed together. The platform is not apt to be retrofitted, or to be removed and replaced while the wind turbine is in service.

In EP 2185816, a wind turbine platform is combined with the transition piece that connects the tower of the wind turbine to a foundation such as a monopile. The platform is complex to assemble and more difficult still to disassemble, being an intrinsic part of the wind turbine structure to be fixed during installation of the wind turbine. The platform is also designed for personnel access and not for supporting heavy and bulky equipment. If scaled up to handle much heavier loads than personnel visiting the wind turbine, the platform would become even less practical to handle.

EP 2586933 teaches ways of mounting a conventional ring-shaped work platform onto a wind turbine tower. In that example, the work platform is assembled in part-circular sections around the tower to complete a full circle, the sections being hung on discrete lugs or flanges projecting from the tower. The sections are then fixed permanently by welding. Precise alignment of the sections with the flanges is essential, which may be challenging when lifting from an installation vessel floating offshore. Also, a crane of the vessel requires access all around the tower. Relocating the vessel to allow all-round access is time-consuming and so may not be practical, especially if the vessel is of jack-up type designed to stand temporarily on the seabed.

WO 2016/122334 discloses a cantilever platform mounted on the side of a jacket structure supporting an offshore platform. The cantilever platform is not intended to support equipment permanently. Instead, the cantilever platform serves as an intermediate holding station for equipment that is lifted onto the cantilever platform from a vessel with a low-lift crane before being lifted further by another crane onto the platform above. Thus, the cantilever platform is small and is so close to sea level that it is susceptible to wave action in rough seas.

In contrast, WO 2021/136570 discloses a work platform attached to the nacelle of a wind turbine. Consequently, the work platform is at great height, is limited in area and cannot support heavy loads. Also, as the work platform is mounted on a moving part of the wind turbine, it would not be practical to connect an electrolyser on that platform to pipework for supplying hydrogen.

Against this background, the invention resides in an external equipment support system for a wind turbine, the system comprising: a hub encircling, coextensive or integrated with a tower or transition piece of the wind turbine and surrounding a central axis of the tower or transition piece, the hub defining at least one docking bay; and at least one support module that is releasably engageable with mounting formations of the or each docking bay and is thereby cantilevered from the hub.

The or each support module may be elongate in a radially outward direction extending from the central axis. At least one support module can support electrolyser equipment and/or a solar cell array.

To facilitate retrofitting, the hub may be in parts that, when assembled together, form a continuous loop around the central axis. Preferably, the hub comprises a plurality of docking bays that are spaced apart angularly around the central axis, in which case a plurality of support modules are releasably engageable with the mounting formations of the respective docking bays. The hub may, for example, have a polygonal outline shape in plan view, each of the docking bays corresponding with a respective side of the polygonal shape. The support modules can surround the hub in a petaloid arrangement.

The hub suitably comprises a tubular wall surrounding the central axis. Where the or each support module comprises a platform, the hub may comprise a horizontal flange that can substantially abut with the platform. The platform and the flange can be on substantially the same horizontal level when the support module is cantilevered from the hub.

The mounting formations of the or each docking bay are suitably spaced from, and symmetrical about, a plane containing the central axis. The or each docking bay and the support module have complementary mounting formations that may include seats for receiving respective trunnions. For example, the mounting formations of the or each docking bay may comprise the seats and the mounting formations of the or each support module may comprise the trunnions.

Elongate guides such as slots or grooves can extend from the seats and may be open-ended to receive the trunnions. For example, such guides may extend upwardly and outwardly from the seats to open outer ends.

The mounting formations of the or each docking bay may further comprise at least one pivot stop and/or at least one lock formation disposed at a level beneath the seats or the trunnions. The or each pivot stop may be opposed to a pivot stop of a support module engaged with the hub. Conveniently, the or each lock formation may be engageable with a complementary lock formation of a support module engaged with the hub upon pivotal movement of that support module about the trunnions engaged with the seats. For example, the lock formations of the or each docking bay and support module suitably overlap with each other upon said pivotal movement. At least one lock element such as a locking pin could act between the lock formations.

The hub may be rotatable relative to the tower or transition piece about the central axis. For example, an onboard drive can act between the hub and the tower or transition piece to rotate the hub, or an external drive can act on the hub to rotate the hub.

The inventive concept also embraces a corresponding method of supporting equipment externally on a wind turbine. The method comprises: releasably engaging at least one cantilevered support module with at least one docking bay of a hub, which hub encircles or is coextensive or integral with a tower or transition piece of the wind turbine and surrounds a central axis of the tower or transition piece. A plurality of support modules can be releasably engaged with respective docking bays of the hub that are spaced apart angularly around the central axis.

Conveniently, the or each support module can be hooked onto the or each docking bay of the hub for engagement with the hub. The or each support module can then be pivoted about the hooked engagement, whereupon locking formations of the or each support module and docking bay can be engaged with each other by virtue of that pivoting movement relative to the hub. A lock element can also be engaged between the lock formations.

At least some equipment can be installed on the or each support module after engaging the or each support module with the hub. At least some equipment can also, or instead, be installed on the or each support module before engaging the or each support module, carrying that equipment, with the hub.

In some embodiments, the hub can be turned about the wind turbine between installation of successive support modules on the hub. This allows an installation vessel to be kept substantially stationary between installation of successive support modules on the hub. The hub can then be fixed relative to the wind turbine after installing the support modules on the hub.

Preliminarily, the hub can be assembled from two or more parts around the tower or transition piece of the wind turbine. For example, the hub can be assembled in a retrofitting operation performed on a previously operational wind turbine.

In summary, the invention is exemplified by a standardised cantilever support module, such as a platform, that can hold bulky equipment such as hydrogen production infrastructure. The invention thereby provides a scalable modular system allowing pre-outfitting of standard units that can then be installed or docked onto bays or faces of a customisable mounting piece or receiving hub.

Whilst the hub could be located at any level on the wind turbine, the hub is preferably located at or near to the base of the wind turbine tower, for example at or near to its interface with a foundation but preferably above the waterline. The hub may take the form of a polygon whose number of sides determines how many cantilever supports 24 can be installed. An installation locking system is also standardised and may be welded to or otherwise incorporated into the hub.

Embodiments of the invention provide an external platform system for wind turbines such as offshore wind turbines, the system comprising: a hub on the wind turbine tower, the hub having at least one flat face circumferentially; and least one cantilever module or support, exemplified as a platform, that is mounted or mountable on a flat face of the hub serving as a mount or interface for the platform. The platform may, for example, be connected to the hub by flanges or trunnions by which the platform can be hung from the hub. The system could comprise at least two distinct platforms mounted on different respective flat faces of the hub. At least one platform can carry an electrolyser to produce hydrogen.

The hub is apt to be integrated into the tower or integrated into a transition piece between the foundation and the tower.

The hub could instead be interposed between the tower and a transition piece. Thus, the hub could be coextensive with the tower or the transition piece or could instead be mounted to and surround the tower.

The hub is preferably ring-shaped in plan view. However, the hub can have a prismatic outer shape that is polygonal in horizontal cross-section, the sides of that polygon corresponding to respective ones of the flat faces and hence the platforms.

In some embodiments, the hub can turn or rotate about the tower to facilitate installation of the cantilever platforms. After installation of the cantilever platforms, the hub may be locked against rotation in a permanent position.

Correspondingly, embodiments of the invention implement a method to install a cantilever platform outside a wind turbine. The method comprises providing a hub in or on the wind turbine tower, wherein the hub circumferentially comprises at least one flat face; lifting a cantilever platform from or using an installation vessel; and assembling the cantilever platform to the flat face of the hub.

The hub may be static, in which case the installation vessel can move around the wind turbine to install cantilever platforms on respective faces of the hub. Alternatively, the hub can rotate about the wind turbine so that the installation vessel does not need to move while installing the cantilever platforms. The method may additionally comprise locking the hub in a permanent solution, for example by welding or by inserting pins, shafts or other interlocking members acting between the hub and the static structure of the wind turbine.

Embodiments of the invention can also implement a method of retrofitting an existing wind turbine to install additional equipment. That method comprises: assembling a hub around a tower of the wind turbine, the hub having at least one flat face; installing a cantilever platform on the flat face of the hub; and installing additional equipment on the cantilever platform, either before or after installation of the cantilever platform.

In summary, the invention provides and exploits a system that is arranged to support equipment such as electrolysers externally on a wind turbine. A hub encircling or coextensive with a tower or transition piece of the wind turbine surrounds a central vertical axis. The hub defines at least one docking bay having mounting formations to which a support module can be releasably engaged, thereby providing an equipment platform cantilevered from the hub.

Where the hub comprises a plurality of docking bays spaced apart angularly around the central axis and corresponding with respective sides of a polygon in plan view, a corresponding plurality of support modules can be engaged with the hub in a petaloid arrangement.

On installation, each support module may be suspended on hook formations of a docking bay and may then be pivoted into engagement with other mounting formations of the docking bay. The hub is apt to be assembled from sections around the tower in a retrofitting operation performed on a previously operational wind turbine, or can be incorporated into or added to the structure of a wind turbine before the wind turbine is first used.

In order that the invention may be more readily understood, reference will now be made, by way of example, to the accompanying drawings in which.

Figure 1:
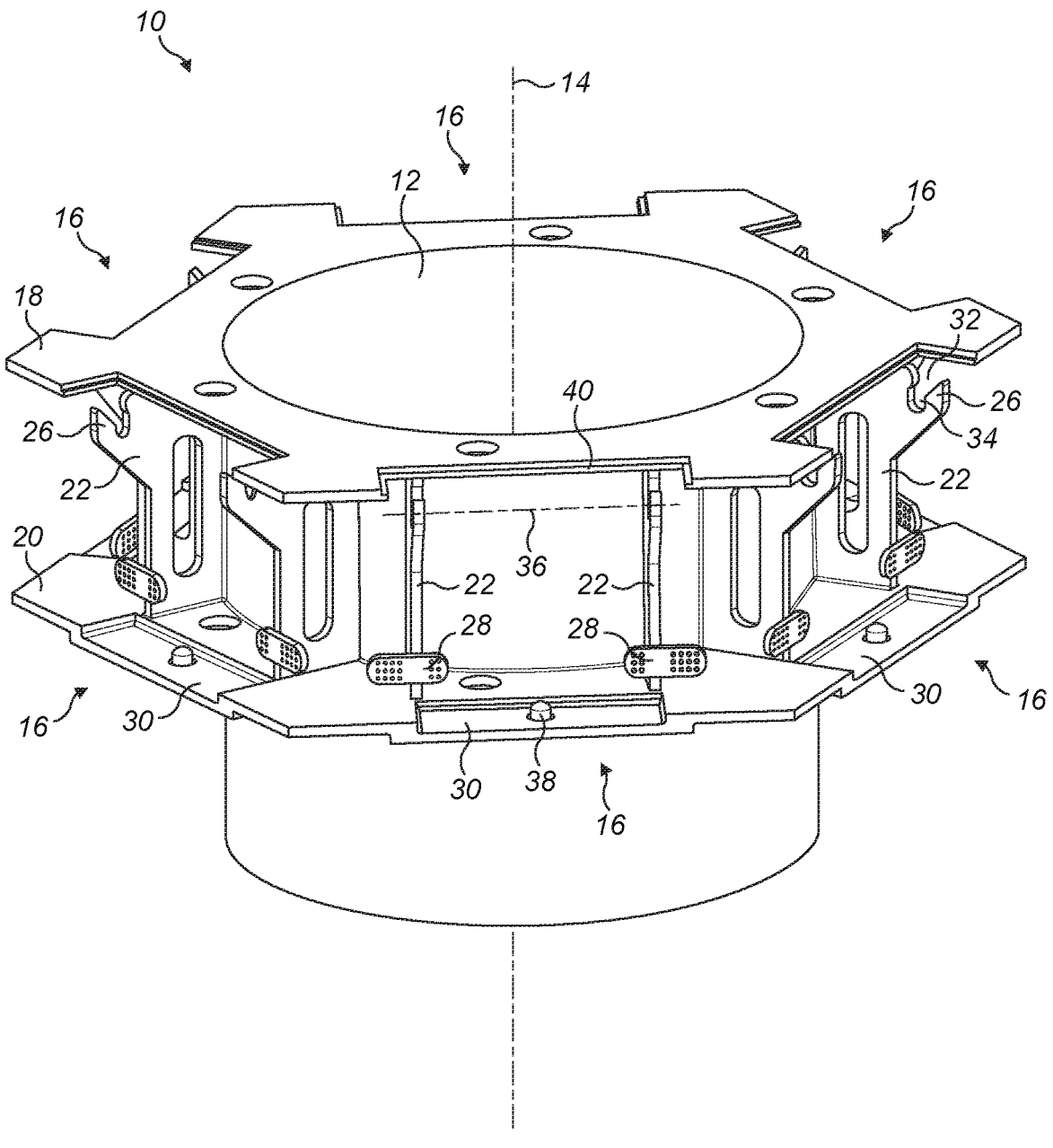
FIG. 1 is a perspective view of a mounting piece serving as a hub for the attachment of up to six cantilever supports to a wind turbine structure.
Figure 2:
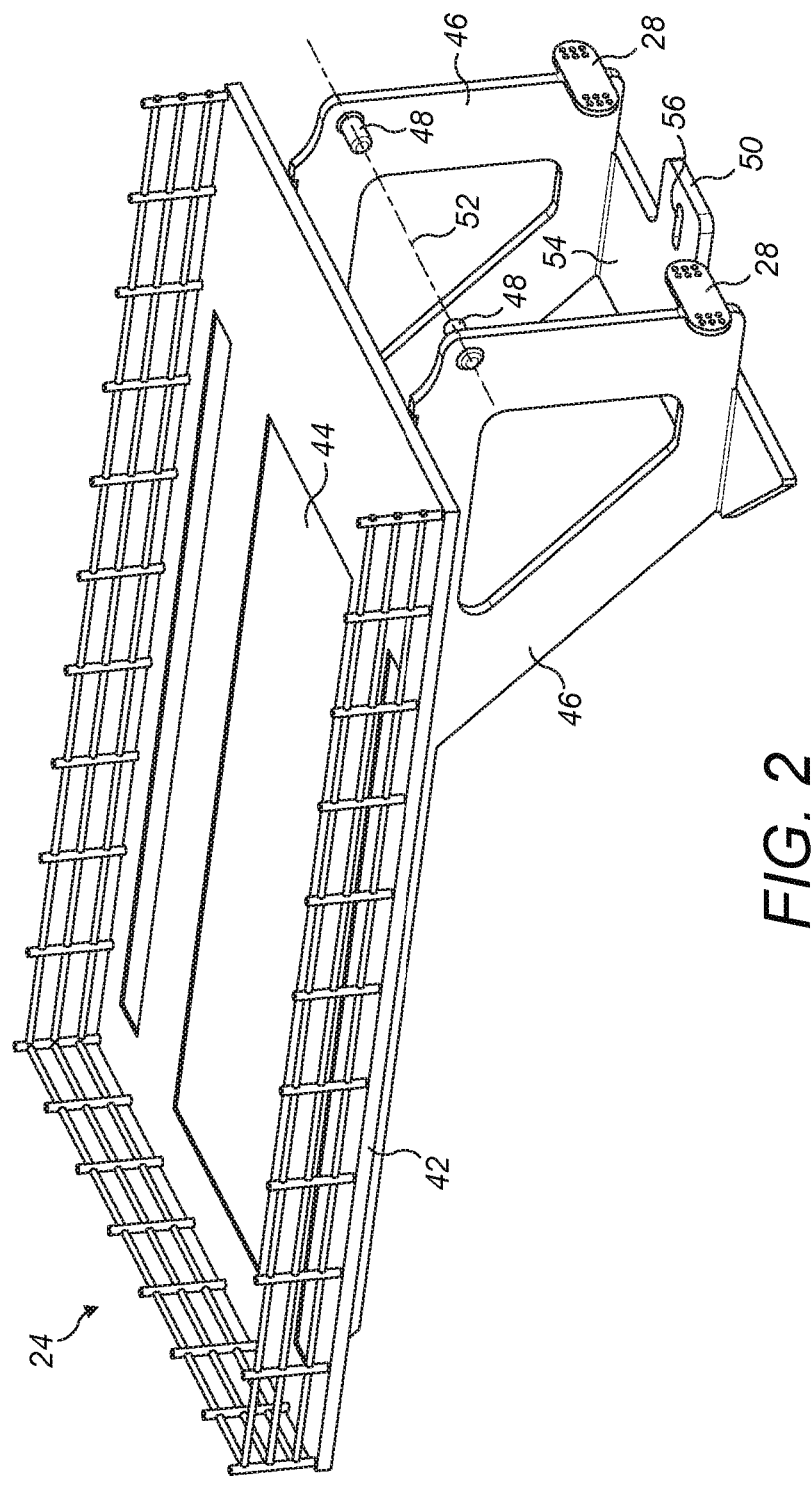
FIG. 2 is a perspective view of one of the cantilever supports that can be attached to the hub of FIG. 1.
Figure 5A:
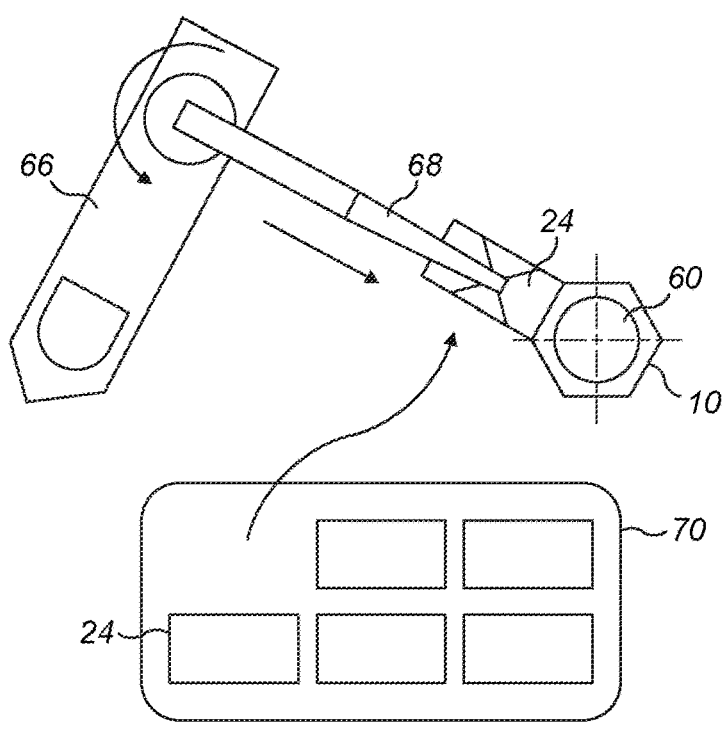
FIGS. 5a and 5b are a sequence of schematic plan views showing an installation vessel attaching a series of cantilever supports to a hub that is in fixed relation to a tower of an offshore wind turbine.
Figure 5B:
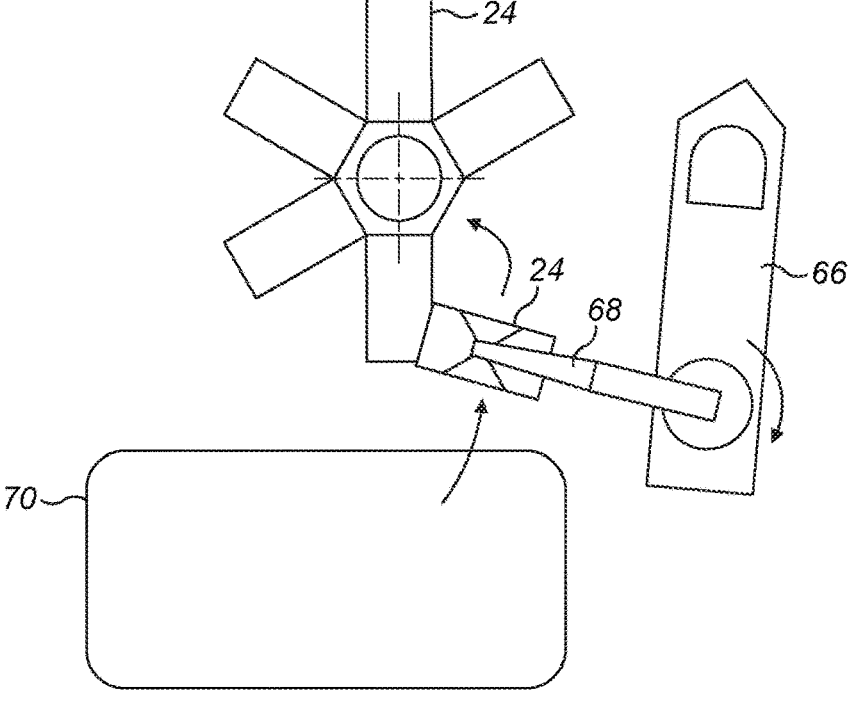
Figure 6:
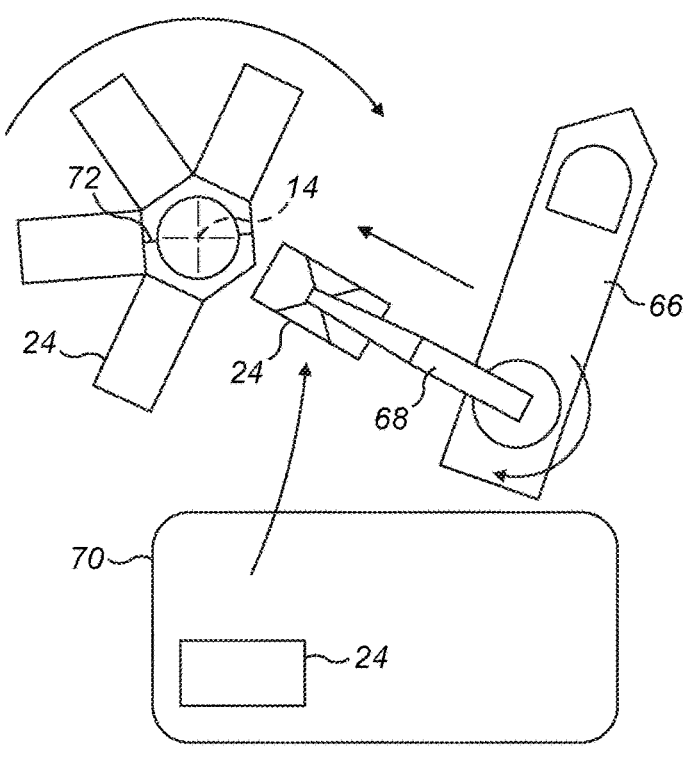
Figure 7:
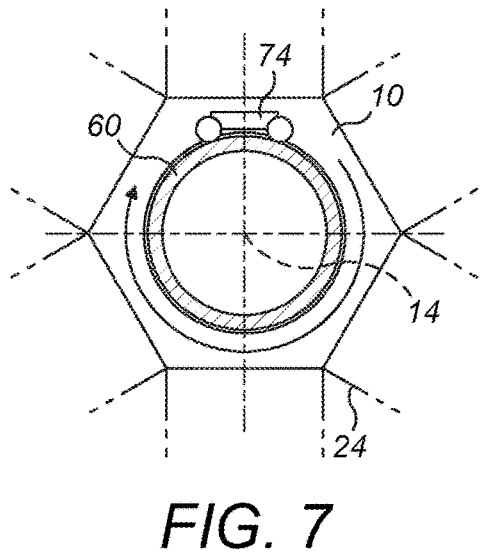
Figure 8:
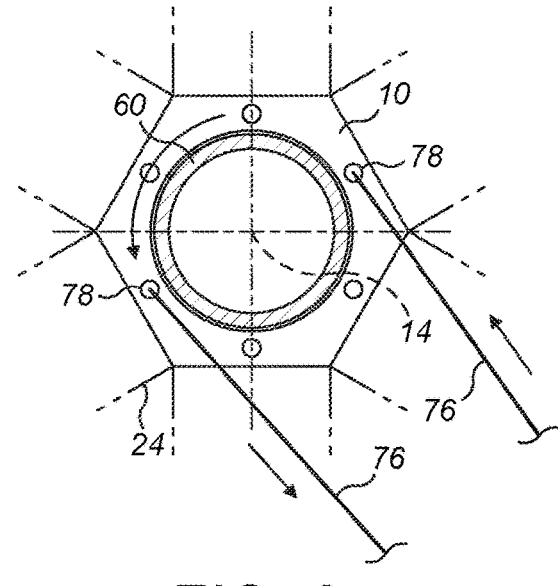
Figure 10:
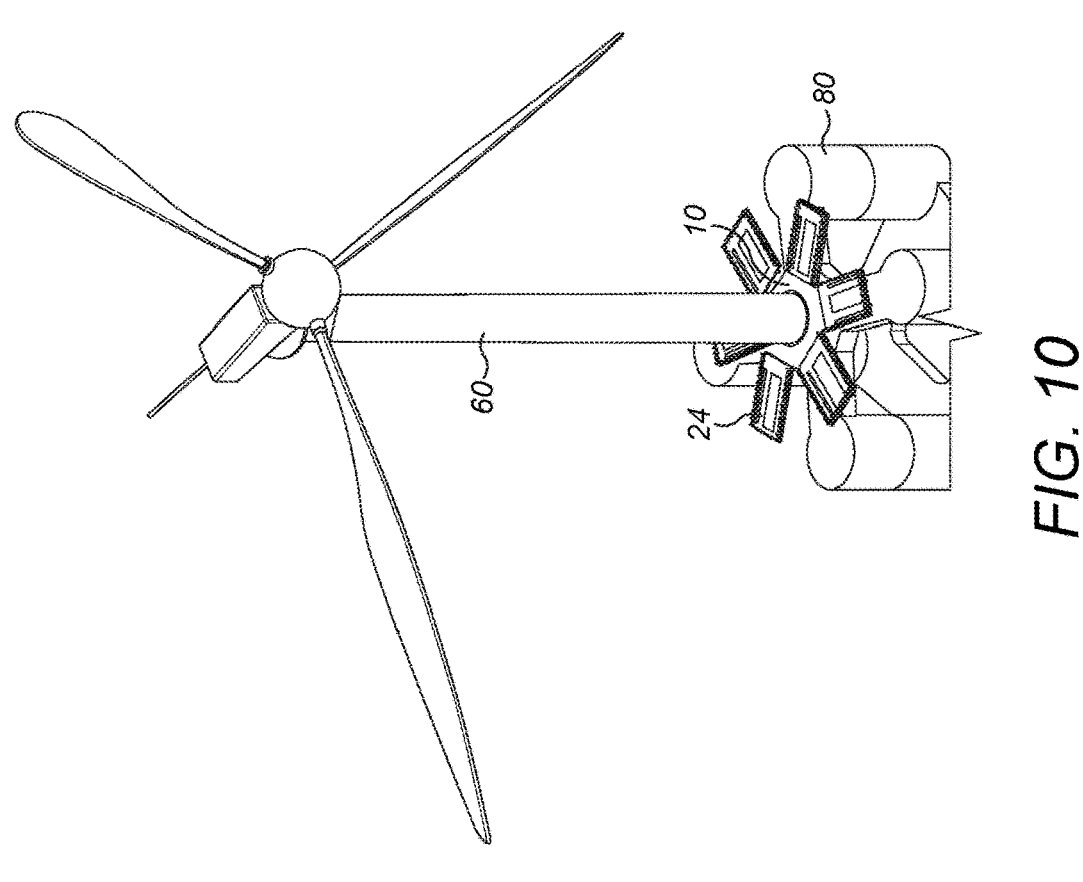
Figure 9:
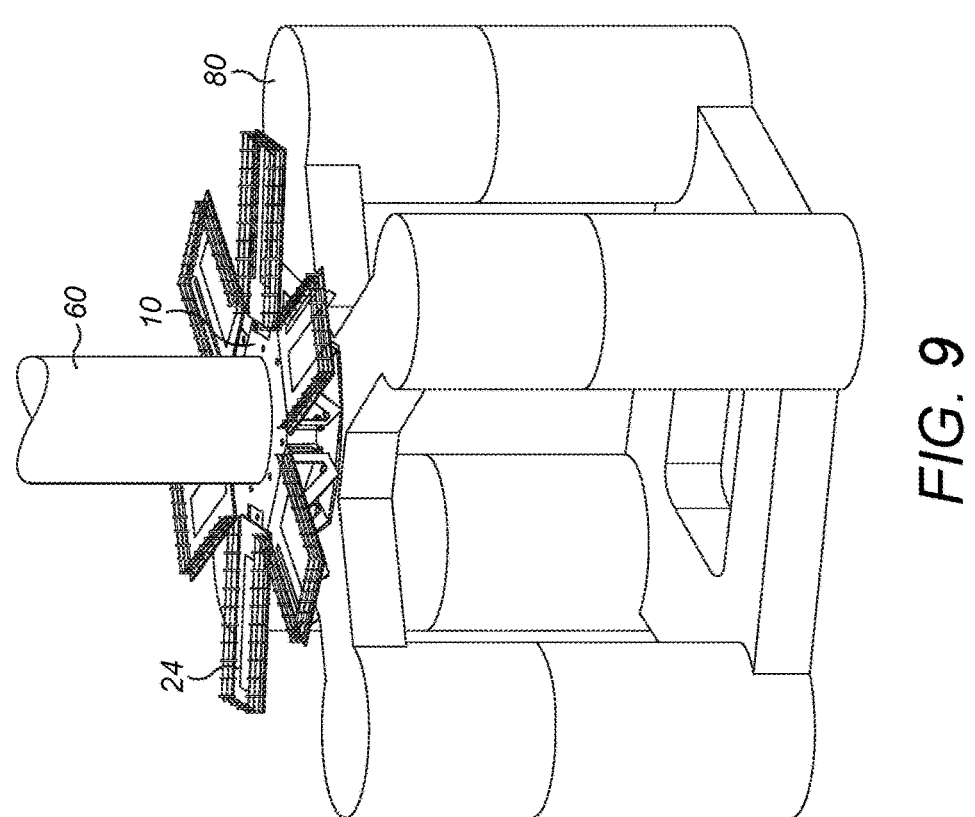
Figure 11:
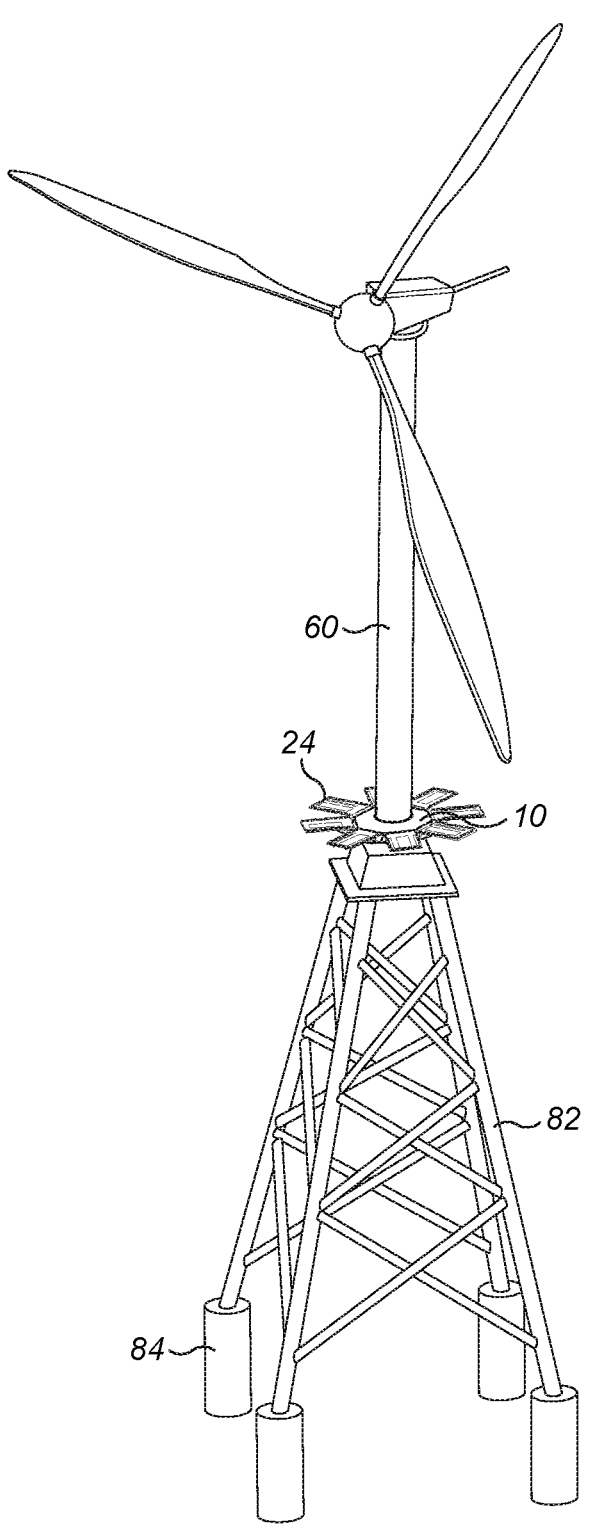
Figure 12:
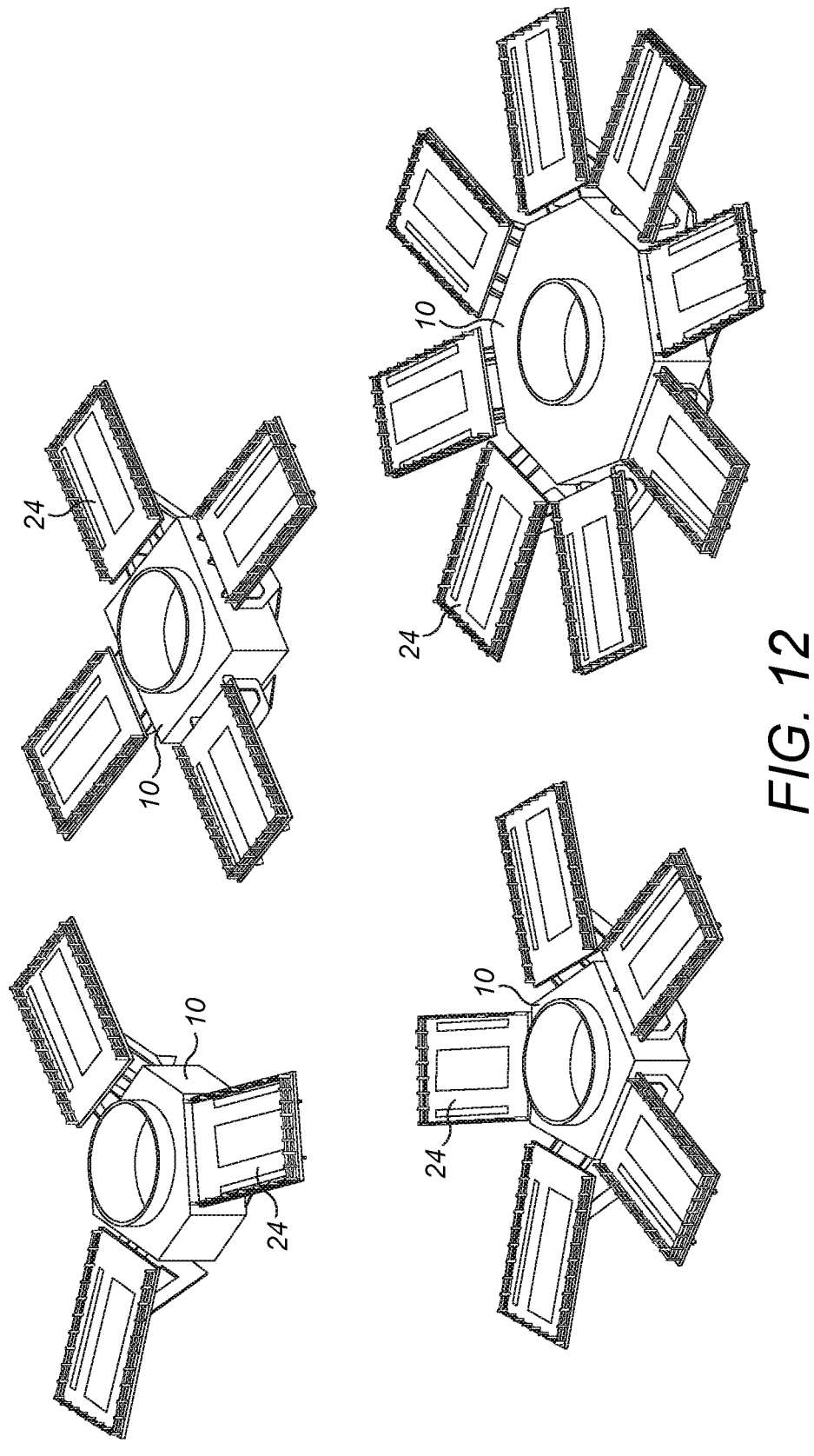

FIG. 6 corresponds to FIGS. 5a and 5b but shows the installation vessel attaching a series of cantilever supports to a hub that turns about the tower of the wind turbine;

FIG. 7 is a schematic detail plan view showing an onboard drive arrangement for turning the hub of FIG. 6 about the tower of the wind turbine;

FIG. 8 is a schematic detail plan view showing an external drive arrangement for turning the hub of FIG. 6 about the tower of the wind turbine;

FIGS. 9 and 10 are perspective views of a floating offshore wind turbine structure whose tower is surrounded by an array of cantilever supports of FIG. 2, those supports being attached to a hub of FIG. 1 situated above a buoyant base supporting the wind turbine;

FIG. 11 is a perspective view of an offshore wind turbine structure whose tower is surrounded by an array of cantilever supports attached to a hub, the turbine being supported in this instance by a jacket structure that stands on the seabed; and FIG. 12 is a group of perspective views of variants in which hubs are configured for attachment of three, four, five and eight cantilever supports.

Referring firstly to FIG. 1 of the drawings, a mounting piece or hub 10 of the invention is fabricated of steel. Centrally, the hub 10 is penetrated by an aperture of circular cross-section defined by an inner tubular core 12 that is rotationally symmetrical about a central vertical axis 14. In plan view, however, the hub 10 is of faceted, polygonal outline whose sides are defined by upright faces 16, equiangularly spaced about the central axis 14.

In this example of the hub 10, there are six equal faces 16 in a hexagonal arrangement but other polygonal arrangements are also envisaged, as will be explained. Each side of the polygonal outline, and therefore each face 16, lies on a respective tangent of a common circle centred on the central axis 14. The polygonal shape is generally straight-sided with each side inclined at 120° with respect to its neighbouring sides.

The faceted shape of the hub 10 is defined by upper and lower flanges 18, 20 extending horizontally from the tubular core 12, those flanges 18, 20 being mutually spaced along the central axis 14. The upper and lower flanges 18, 20 are joined by vertical ribs 22 extending outwardly from the core 12, the ribs 22 being angularly spaced about the central axis 14. The ribs 22 are grouped in pairs, one pair per face 16 of the hub 10, and the ribs 22 of each pair lie in mutually parallel vertical planes.

In general terms, each face 16 of the hub 10 is flat but viewed in detail, each face 16 comprises mounting formations to serve as a mount or docking station for attachment of a respective modular cantilever support 24 as illustrated in FIG. 2. The mounting formations comprise a hook formation 26 and a pad 28 on each rib 22, and a central recess 30 disposed between each pair of ribs 22 of each face 16. In this example, the mounting formations are symmetrical or in mirrored relationship about a plane that bisects the face 16 and that contains the central axis 14.

Each hook formation 26 is defined by a shaped outer edge portion of a rib 22. Specifically, an upper part of the outer edge portion extends upwardly and outwardly and contains an outwardly-opening cut-out slot 32, that slot 32 also extending upwardly and outwardly. The base of the slot 32 defines a part-circular seat 34.

The slots 32 of each pair of ribs 22 are in mutual alignment on a horizontal axis 36 that extends between those slots 32, parallel to the associated face 16. Thus, the seats 34 of their slots 32 are on the same level and are the same distance from the central axis 14 of the hub 10.

Each pad 28 is disposed on an outer edge of a respective rib 22 beneath the slot 32, close to the lower flange 20. An outer side of each pad 28 lies in a vertical plane, orthogonal to the plane of the associated rib 22.

Rectangular depressions in the lower flange 20 define the central recesses 30 of the respective faces 16. Each recess 30 extends between the ribs 22 of the associated face 16 and faces upwardly toward the upper flange 18. A central protrusion 36 stands proud of the base of each recess 30. That protrusion 36 may be integral with the lower flange 20 or could be removably attachable to the lower flange 20, in the manner of a pin.

Each recess 30 in the lower flange 20 is opposed by a respective rectangular cut-out 40 in the outer edge of the upper flange 18, that cut-out 40 extending laterally beyond the ribs 22. The cut-out 40 thereby exposes the hook formations 26 in the outer edge portions of the ribs 22, when viewed from above.

Returning to FIG. 2, an outboard end of the cantilever support 24 is shown here to the left and an inboard end of the cantilever support 24 is shown to the right. The inboard end of the cantilever support 24 is an interface that can engage with any of the faces 16 of the hub 10, those faces 16 thereby serving as docking bays for a corresponding number of cantilever supports 24.

The cantilever support 24 comprises an elongate horizontal platform 42 that, in this example, is generally rectangular in plan view. An optional handrail and equipment mounts 44 are shown surmounting the platform 42.

The platform 42 lies atop a pair of parallel longitudinal braces 46 that are in respective vertical planes, those planes being symmetrically spaced about, and parallel to, a longitudinal centreline of the platform 42. Each brace 46 comprises an enlarged, relatively deep inboard portion that tapers in height to a shallower outboard portion.

The inboard portions of the braces 46 hold mounting formations of the cantilever support 24 that complement and cooperate with the mounting formations 26, 28, 30 of the hub 10, enabling the cantilever support 24 to be mounted onto any of the faces 16 of the hub 10. Specifically, the mounting formations of the cantilever support 24 comprise a trunnion 48 and a pad 28 on each brace 46, and a tab 50 disposed centrally between the braces 46.

An upper inboard portion of each brace 46 supports a respective trunnion 48. The trunnions 48 of each cantilever support 24 extend orthogonally with respect to the planes of their respective braces 46 and in this example face inwardly toward each other, although in other examples they could face outwardly away from each other. The trunnions 48 are in mutual alignment on a common horizontal axis 52 that lies parallel to the inboard edge of the platform 42.

The horizontal spacing between the braces 46 is slightly greater than the horizontal spacing between paired ribs 22 of the hub 10. This allows the pair of braces 46 of a cantilever support 24 to fit closely around and outside or embracing any pair of ribs 22 of the hub 10. The aforementioned cut-outs 40 in the outer edge of the upper flange 18 extending laterally beyond the paired ribs 22 provide lateral clearance to receive the braces 46 around the ribs 22. In doing so, the trunnions 48 on the inner sides of the braces 46 can fit within respective slots 32 in the hook formations 26 of the ribs 22.

The braces 46 of the cantilever support 24 also support pads 28 that are located in mutual opposition to the pads 28 of the ribs 22. Thus, each pad 28 of the cantilever support 24 is disposed on an inboard edge of a respective brace 46, beneath a trunnion 48. An inboard side of each pad 28 lies in a vertical plane, orthogonal to the plane of the supporting brace 46.

The tab 50 is supported by a horizontal cross-member 54 that extends between the braces 46 at the bottom of their enlarged inboard portions. In addition to supporting the tab 50, the cross-member 54 completes a box section that stiffens the structure of the braces 46. The tab 50 is a plate or tongue that extends horizontally in an inboard direction from a central point of the cross-member 54. The tab 50 is penetrated by a central opening 56.

The functions of the various mounting formations will now be explained with additional reference to the sequence of views in FIGS. 3a to 3c.

Figure 3A:
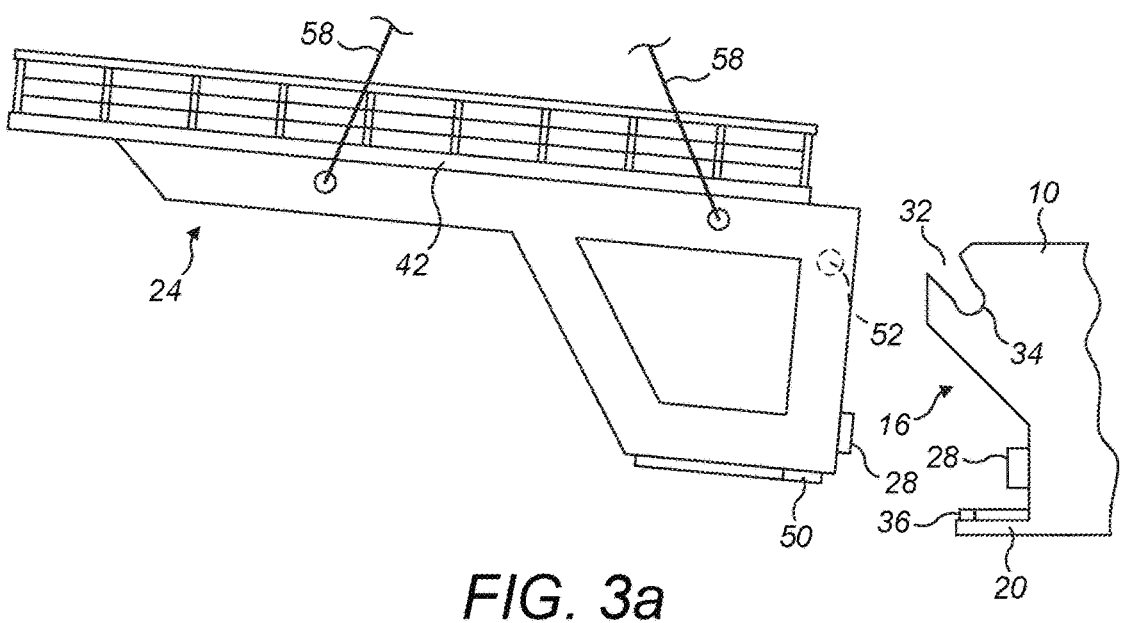
FIGS. 3a to 3c are a sequence of schematic detail side views showing a cantilever support of FIG. 2 being attached to a hub of FIG. 1.
Figure 3B:
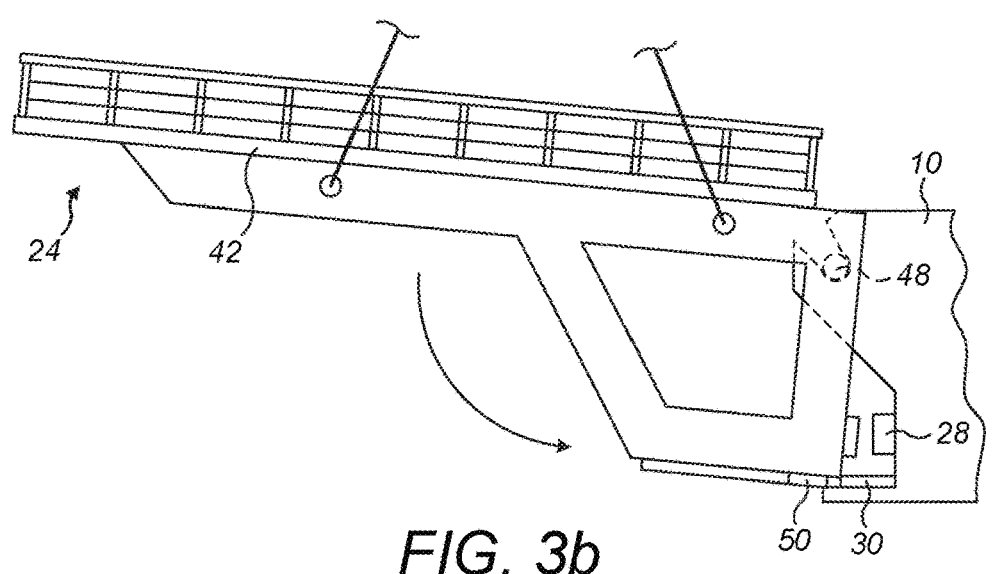

FIG. 3a shows a cantilever support 24 suspended from lifting tackle 58 of a crane and being lowered toward a face 16 of the hub 10. FIG. 3b then shows a first phase of engagement of the cantilever support 24 with the hub 10, where a trunnion 48 enters a slot 32 and is received in the part-circular seat 34 at the base of the slot 32. Thus, the slot 32 serves as a guide for downward and inward movement of the trunnion 48 into engagement with the seat 34. Up to and including this stage, the platform 42 of the cantilever support 24 may be inclined upwardly and outwardly, as shown, to ease insertion of the trunnions 48 into the slots 32.

Figure 3C:
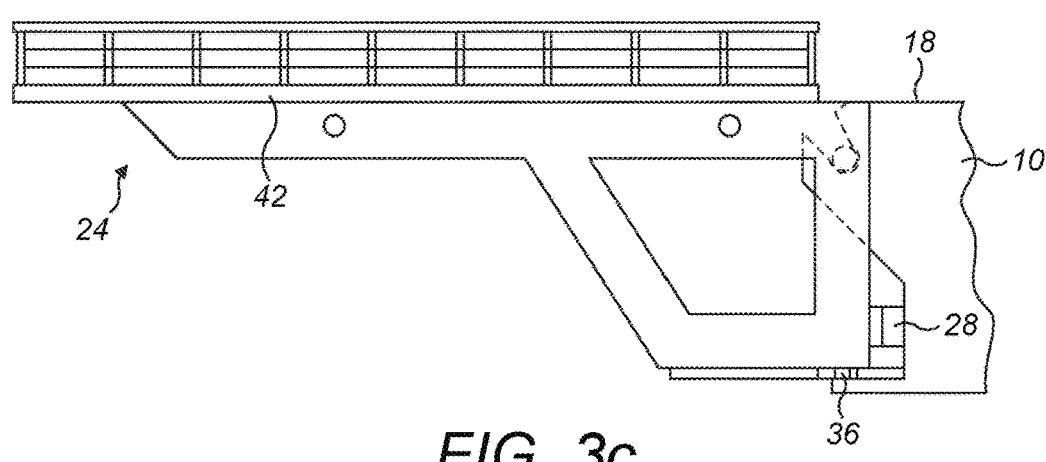

FIG. 3c shows that when the trunnions 48 are located in the seats 34 of the slots 32 to take the weight of the cantilever support 24, the cantilever support 24 is lowered further to bring the platform 42 into a horizontal orientation. In doing so, the cantilever support 24 pivots about the axis 52 of the trunnions 48 causing the tab 50 to override the recess 30 in the lower flange 20 of the hub 10. The recess 30 thereby accommodates the tab 50, which lies parallel to and above the horizontal base of the recess 30.

Pivoting of the cantilever support 24 ends when the pads 28 of the cantilever support 24 bear against the pads 28 of the hub 10. Thus, the pads 28 abutting in mutual opposition serve as pivot stops. Engagement of the cantilever support 24 with the hub 10 is then substantially complete. The platform 42 then abuts and lies substantially level with the upper flange 18. In this way, the upper flange 18 can join multiple platforms 40 to define a common, continuous level area surrounding the central axis 14.

The central opening 56 of the tab 50 receives and engages with the central protrusion 36 of the recess 30. The opening 56 of the tab 50 can either ride over and engage with a fixed protrusion 36 or the protrusion 36, in the form of a movable or removable pin or lug, can be inserted into the opening 56 after the tab 50 has been received in the recess 30. The tab 50 and the recess 30 therefore serve as locking formations with the protrusion 36 serving as a latch member or lock element that locks the cantilever support 24 to the hub 10, further restraining both lateral and longitudinal movement of the cantilever support 24.

Figure 4:
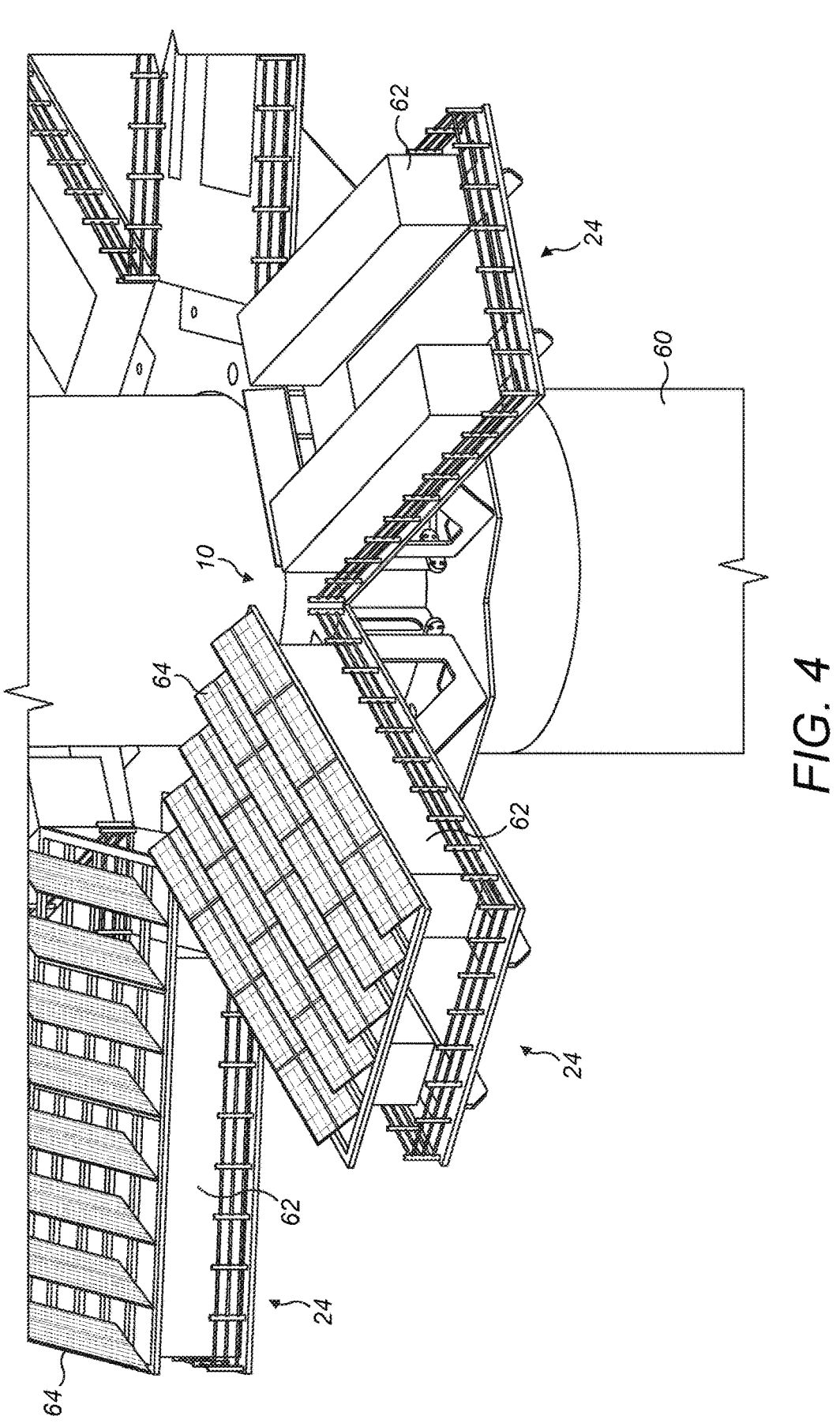
FIG. 4 is a perspective view of a wind turbine structure fitted with an array of six cantilever supports of FIG. 2 attached to a hub of FIG. 1, those supports serving as platforms for electrolysers surmounted by solar panel arrays.

Turning next to FIG. 4, this shows a hub 10 attached to or incorporated into a wind turbine tower 60. For example, the hub 10 can surround the tower 60 and can be attached to the tower 60 by inwardly-extending bolts or by being hung on a flange that is welded or bolted to the tower 60. The hub 10 is fitted with a circumferential array of angularly-spaced cantilever supports 24 in a petaloid arrangement.

Once attached to the hub 10 as shown in FIG. 4, the cantilever supports 24 are ready to be fitted with whatever items of equipment they are designed to support. Here, electrolysers 62 are shown fitted to some of the cantilever supports 24. Also, some of those electrolysers 62 are used to support arrays of solar panels 64, which may be inclined in whatever direction is best to capture the prevailing solar radiation.

FIG. 4 shows the cantilever supports 24 attached to the hub 10 before equipment is fitted to the cantilever supports 24. However, it may be possible instead to lift cantilever supports 24 into engagement with the hub 10 with at least some equipment already fitted to them.

FIGS. 5a and 5b show an installation vessel 66 using its crane 68 to lift cantilever supports 24 from a barge 70 and into engagement with a hub 10 in a fixed position on the tower 60 of a wind turbine. FIG. 5a shows a first of six cantilever supports 24 being engaged with the hub 10 and FIG. 5b shows the last of those cantilever supports 24 about to be engaged with the hub 10. The installation vessel 66 and the barge 70 are repositioned relative to the wind turbine as necessary to allow access to the next vacant docking bay defined by a face 16 of the hub 10.

To avoid the inconvenience of moving the installation vessel 66 while installing a succession of cantilever supports 24, provision may be made for the hub 10 to rotate about the vertical axis 14 of the wind turbine tower 60 as shown in FIG. 6. For example, the hub 10 could run on a circumferential horizontal rail that encircles the tower 60. Stepwise angular movement of the hub 10 brings vacant docking bays into a fixed position and orientation that is readily accessible by the crane 68 of the installation vessel 66. The installation vessel 66 is shown here about to engage the fifth of six cantilever supports 24 to the hub 10, the first four cantilever supports 24 having already been installed.

In FIGS. 5a, 5b and 6, the cantilever supports 24 could instead be lifted from a deck of the installation vessel 66 itself, if that deck is large enough. Also, the cantilever supports 24 can be installed on the hub 10 in any order, for example in circumferential succession or in opposed pairs, one on one side of the tower 60 and the next on an opposite side of the tower 60 to maintain balance. The installation vessel 66 could float on the surface of the surrounding water or could be a jack-up rig that stands on the seabed and has a hull raised clear of the surface.

FIG. 6 also shows a division 72 that exemplifies how a hub 10, whether fixed or rotary, could be divided into two or more parts each being part of a full loop. The parts of the hub 10 can be assembled together around the tower 60 or transition piece of a wind turbine, thereby completing a continuous loop. This facilitates retrofitting the hub 10 to an existing wind turbine installation.

FIGS. 7 and 8 show ways of driving rotational movement of the hub 10 as envisaged in the arrangement of FIG. 6. Specifically, FIG. 7 shows an onboard drive arrangement and FIG. 8 shows an external drive arrangement for turning the hub 10 about the tower 60 of a wind turbine.

In the onboard drive arrangement of FIG. 7, a drive unit 74 fixed to the hub 10 drives wheels 76 or gears that engage the tower 60 to drive rotational movement of the hub 10. The arrangement could be reversed, with the drive unit 74 instead being fixed to the tower 60 and driving wheels or gears that engage the hub 10.

In the external drive arrangement of FIG. 8, lines 76 extend from opposed attachment points 78 on the hub 10 to one or more winches on a surface vessel (not shown here), such as the installation vessel 66. By applying tension to an appropriate one of the lines 76, the winches drive rotational movement of the hub 10 in a desired direction about the tower 60.

FIGS. 9, 10 and 11 show a petaloid array of cantilever supports 24 attached to a hub 10 situated at the base of a wind turbine tower 60. In FIGS. 9 and 10, the wind turbine is supported by a semi-submersible buoy 80 whereas the wind turbine of FIG. 11 is supported by a jacket structure 82 whose legs terminate in subsea foundations 84 such as suction piles to be embedded in seabed soil.

Finally, FIG. 12 shows variants in which hubs 10 are configured for attachment of three, four, five and eight cantilever supports 24 in, respectively, triangular, square, pentagonal and octagonal arrangements. Other petaloid variants are possible, such as a heptagonal arrangement involving seven cantilever supports 24. In general, for a given size of hub 10, the fewer the sides or faces 16, the greater the width of the cantilever supports 24 that can be attached to those faces 16. However, smaller, lighter and more numerous cantilever supports 24 may be helpful for operational flexibility and to ease their installation.

Many other variations are possible within the inventive concept. For example, the cantilever supports need not be rectangular or parallel-sided in plan view. Instead, the cantilever supports could narrow outwardly, hence with outwardly convergent sides, or could widen outwardly, hence with outwardly divergent sides. In the latter case, the sides of the cantilever supports could splay outwardly to such an extent that angular gaps between neighbouring supports are narrowed or even eliminated. In that way, the cantilever supports could define a circumferentially continuous supporting surface around the tower of a wind turbine.

Whilst the hubs described have regular polygonal outlines with sides all of equal length and faces all therefore of equal width, it would be possible in principle for at least some of the sides to be of unequal length. In this way, the cantilever supports could be of different widths from one to the next around the circumference of the hub. It would also be possible for the cantilever supports to be of different lengths and therefore to extend to different radial extents relative to the central axis of a common hub.

It is not essential that trunnions are on the cantilever supports and that complementary seats are on the docking bays. The arrangement could be reversed, hence with trunnions on the docking bays engaging with inverted seats on the cantilever supports, or other interlocking arrangements could be provided.

The invention claimed is:

1. An external equipment support system for a wind turbine, the system comprising:
   a hub encircling or coextensive with a tower or transition piece of the wind turbine and surrounding a central axis of the tower or transition piece, the hub defining at least one docking bay; and
   at least one support module that is releasably engageable with mounting formations of the or each docking bay and is thereby cantilevered from the hub,
   wherein the hub is rotatable relative to the tower or transition piece about the central axis.

2. The system of claim 1, wherein the hub comprises a plurality of docking bays that are spaced apart angularly around the central axis and a plurality of support modules are releasably engageable with the mounting formations of the respective docking bays.

3. The system of claim 2, wherein the hub has a polygonal outline shape in plan view, each of the docking bays corresponding with a respective side of the polygonal shape.

4. The system of claim 2, wherein the support modules surround the hub in a petaloid arrangement.

5. The system of claim 1, wherein the hub comprises a tubular wall surrounding the central axis.

6. The system of claim 1, wherein the or each support module comprises a platform and the hub comprises a horizontal flange, the platform and the flange being on substantially the same horizontal level when the support module is cantilevered from the hub.

7. The system of claim 1, wherein the mounting formations of the or each docking bay are spaced from, and symmetrical about, a plane containing the central axis.

8. The system of claim 1, wherein the or each docking bay and support module have complementary mounting formations, those mounting formations including seats for receiving respective trunnions.

9. The system of claim 8, wherein the mounting formations of the or each docking bay comprise the seats and the mounting formations of the or each support module comprise the trunnions.

10. The system of claim 8, further comprising elongate guides that extend from the seats and are open at their outer ends.

11. The system of claim 10, wherein the guides extend upwardly and outwardly from the seats to the open outer ends.

12. The system of claim 8, wherein the mounting formations of the or each docking bay further comprise at least one pivot stop disposed at a level beneath the seats or the trunnions, the or each pivot stop being opposed to a pivot stop of a support module engaged with the hub.

13. The system of claim 1, wherein the mounting formations of the or each docking bay further comprise at least one lock formation disposed at a level beneath the seats or the trunnions, the or each lock formation being engageable with a complementary lock formation of a support module engaged with the hub upon pivotal movement of that support module about the trunnions engaged with the seats.

14. The system of claim 13, wherein the lock formations of the or each docking bay and support module overlap with each other upon said pivotal movement.

15. The system of claim 13, further comprising at least one lock element acting between the lock formations.

16. The system of claim 1, wherein the or each support module is elongate in a radially outward direction extending from the central axis.

17. The system of claim 1, wherein the hub is in parts that, when assembled together, form a continuous loop around the central axis.

18. The system of claim 1, further comprising an onboard drive acting between the hub and the tower or transition piece to rotate the hub.

19. The system of claim 1, further comprising an external drive acting on the hub to rotate the hub.

20. The system of claim 1, wherein at least one support module supports electrolyser equipment.

21. The system of claim 1, wherein at least one support module supports a solar cell array.

22. A method of supporting equipment externally on a wind turbine, the method comprising:

releasably engaging a first cantilevered support module with a first docking bay of a hub, which hub encircles or is coextensive with a tower or transition piece of the wind turbine and surrounds a central axis of the tower or transition piece, turning the hub about the wind turbine, and releasably engaging a second cantilevered support module with a second docking bay of the hub.

23. The method of claim 22, comprising releasably engaging a plurality of support modules with respective docking bays of the hub that are spaced apart angularly around the central axis.

24. The method of claim 22, comprising hooking the or each support module onto the or each docking bay of the hub to engage the or each support module with the hub.

25. The method of claim 24, further comprising pivoting the or each support module about the hooked engagement.

26. The method of claim 25, comprising engaging locking formations of the or each support module and docking bay by virtue of pivoting movement of the or each support module relative to the hub.

27. The method of claim 25, comprising engaging a lock element between the lock formations.

28. The method of claim 22, comprising installing equipment on the or each support module after engaging the or each support module with the hub.

29. The method of claim 22, comprising installing equipment on the or each support module before engaging the or each support module, carrying that equipment, with the hub.

30. The method of claim 22, comprising keeping an installation vessel substantially stationary between installation of successive support modules on the hub.

31. The method of claim 22, comprising fixing the hub relative to the wind turbine after installing the support modules on the hub.

32. The method of claim 22, comprising, preliminarily, assembling the hub from two or more parts around the tower or transition piece of the wind turbine.

33. The method of claim 32, wherein the hub is assembled in a retrofitting operation performed on a previously operational wind turbine.

\* \* \* \* \*